United States Patent [19]

Pound et al.

[11] Patent Number: 5,367,983
[45] Date of Patent: Nov. 29, 1994

[54] DEVICE AND METHOD FOR ITS USE AS AN AID IN CONTROL OF TICKS AND OTHER ECTOPARASITES ON WILDLIFE

[75] Inventors: J. Mathews Pound; J. Allen Miller; Craig A. LeMeilleur, all of Kerrville, Tex.

[73] Assignee: The United States of America as represented by the Secretary of Agriculture, Washington, D.C.

[21] Appl. No.: 105,225

[22] Filed: Aug. 11, 1993

[51] Int. Cl.⁵ .................. A01K 5/00; A01K 13/00
[52] U.S. Cl. ........................... 119/53; 119/157
[58] Field of Search ............ 119/52.1, 53, 157, 159

[56] References Cited

U.S. PATENT DOCUMENTS

| | | | |
|---|---|---|---|
| 45,190 | 11/1864 | Steller | 119/52.1 X |
| 1,095,471 | 5/1914 | Sheldon | 119/157 |
| 1,302,979 | 5/1919 | Schipper | 119/157 X |
| 1,734,035 | 11/1929 | Hargraves | 119/157 X |
| 2,352,859 | 7/1944 | Palmer | 119/157 X |
| 3,919,979 | 11/1975 | Keene | 119/157 |
| 3,941,096 | 3/1976 | Mann | 119/159 |
| 4,014,294 | 3/1977 | Hovorak | 119/157 |
| 4,023,533 | 5/1977 | Mann | 119/159 |
| 4,324,202 | 4/1982 | Stonestreet et al. | 119/157 X |
| 4,459,942 | 7/1984 | Cauthron | 119/159 |
| 4,535,726 | 8/1985 | Cauthron et al. | 119/159 |
| 4,580,529 | 4/1986 | Wilson | 119/159 |
| 5,050,539 | 9/1991 | Liegner | 119/159 |
| 5,056,467 | 10/1991 | Schaefer | 119/159 |

Primary Examiner—Robert P. Swiatek
Attorney, Agent, or Firm—M. Howard Silverstein; Randall E. Deck; John D. Fado

[57] ABSTRACT

An apparatus for feeding and applying pesticides onto animals, particularly wildlife such as deer. The apparatus includes vertical support members carrying pesticide applicators which the animal contacts in the course of feeding.

14 Claims, 6 Drawing Sheets

DEVICE AND METHOD FOR ITS USE AS AN AID IN CONTROL OF TICKS AND OTHER ECTOPARASITES ON WILDLIFE

BACKGROUND OF THE INVENTION

The invention relates to an apparatus and method for feeding and applying pesticide onto animals, particularly wildlife.

Many diseases are transmissible to man and animals by ectoparasites such as ticks. Because some wildlife species, such as white-tailed deer, are capable of propagating and harboring large populations of these ectoparasites, an effective strategy for the prevention of disease transmission should include treatment of animals, including wildlife, for the control of ectoparasites. Yet, the treatment of significant numbers of animals, especially wildlife that are not easily captured or otherwise able to be handled and treated directly, for control of these ectoparasites remains a difficult problem.

In areas where an effort is being made to eradicate ticks, the inability to control ticks on wildlife can be a critical factor to the success of the program. For example, cattle ticks were eradicated from the United States in the 1950's, and a quarantine zone was established along the Texas-Mexico border between Del Rio and Brownsville, Tex. to prevent reinfestation of U.S. cattle herds. Yearly outbreaks of ticks that occur in the quarantine zone are controlled by dipping of cattle and by vacating infested pastures. However, increased populations of white-tailed deer, elk, exotic deer, antelope and other marginal host animals in the region are complicating the eradication effort, and in some areas have prevented eradication of reinfested premises. For other ectoparasites such as deer ticks, the vectors of Lyme disease, wildlife, and white-tailed deer in particular, are the primary hosts for adult ticks. The ability to control these ticks on deer would therefore be a valuable tool in the management of Lyme disease.

SUMMARY OF THE INVENTION

We have now developed an apparatus and method for feeding and applying a pesticide to animals. The apparatus includes an open top receptacle having a bottom and side walls, and a feed supply bin positioned within the receptacle having an opening at its lower end communicating with the bottom of the receptacle. Animal feed within the bin is dispensed to the bottom of the receptacle through the opening to a feeding area which is bound by the lower end of the bin and the bottom and side walls of the receptacle. At least one pair of spaced apart vertical support members are positioned adjacent the side walls of the receptacle, approximately opposite or across from the opening of the feed supply bin, and extend upwardly from the receptacle above the upper edge of the side walls. For application of pesticide upon the feeding animals, a pesticide applicator is positioned on each support member, which is adapted or constructed to apply pesticide onto the animal upon contact therewith (i.e., rubbing). The support members are spaced sufficiently apart to allow an animal to pass its head therebetween and access the feeding area, but are sufficiently close together such that the back of the head, neck and/or ears of the animal will contact one of the applicators when its head is turned sideways. To ensure contact of the animal with an applicator while feeding, an outwardly extending surface is positioned over the opening of the feed supply bin. Being positioned at least partially over the feeding area, the outwardly extending surface effectively forces the animal to turn its head sideways in order to access the feeding area, and hence contact the applicator on the back of its head or neck.

In accordance with this discovery, it is an object of this invention to provide an apparatus for simultaneously feeding and applying pesticide to the head and/or neck of an animal.

It is a further object of this invention to provide an apparatus for applying pesticide to wild animals, particularly those species which may be antlered.

Another object of this invention is to provide an apparatus for applying pesticides to animals for the control of ectoparasites including insect and acarine pests and ticks.

Yet another object is to provide an apparatus for applying pesticides to animals to reduce populations of free-living ticks and thereby decrease the risk of Lyme disease infections especially to humans.

These and other objects and advantages of the invention will become readily apparent from the ensuing description.

Figure 1:
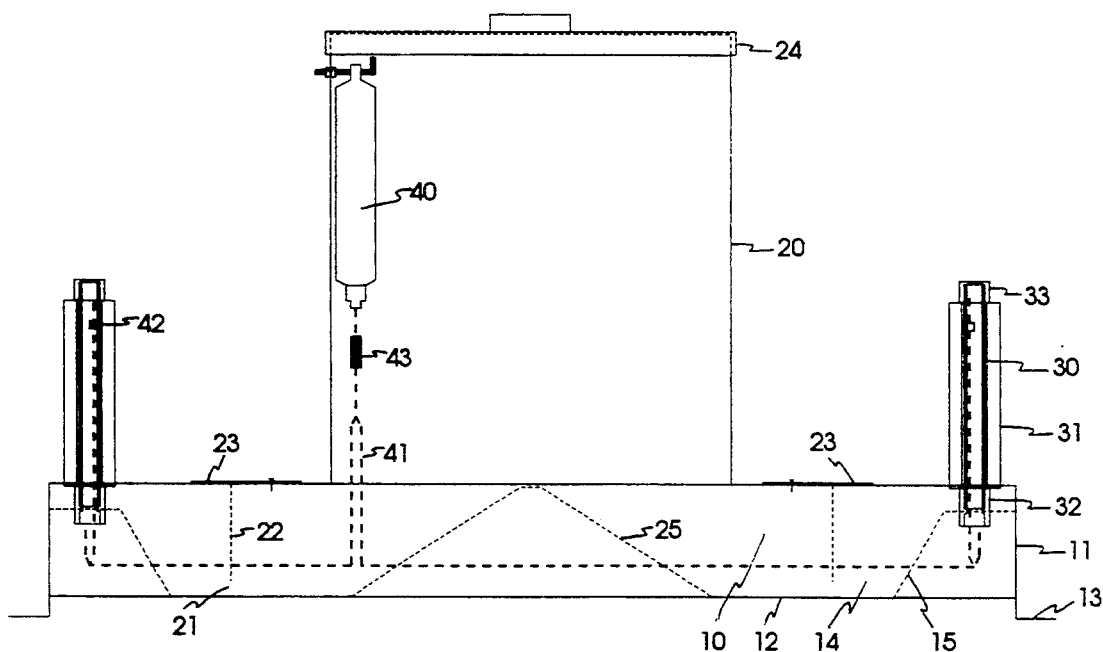
FIG. 1 is a cross-sectional view of an apparatus for feeding and applying pesticides to animals in accordance with one embodiment of this invention.
Figure 2:
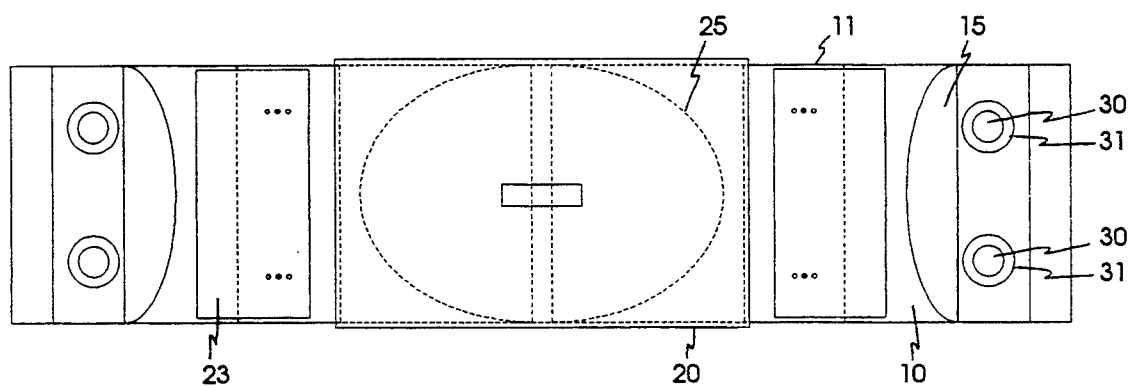
FIG. 2 is a top view of the apparatus of FIG. 1.

REFERENCE CHARACTERS 10 receptacle
11 side walls
12 bottom
13 support stand
feeding area
15 receptacle baffle
20 feed supply bin
21 feed bin opening
22 feed gate
23 outwardly extending surface
24 feed bin cover
25 feed bin baffle
30 vertical support member
31 pesticide applicator
32 coupling
33 cap
40 pesticide reservoir
41 pesticide supply conduit
42 pressure activated flow control valve
43 shut-off valve
50 adjacent reservoir
60 pressure sensitive controller
61 pump

DETAILED DESCRIPTION

The apparatus of this invention was designed for the application of pesticides onto animals as they feed. While the device may be used for applying pesticides to a wide variety of animals, including domestic animals, it is particularly valuable for the treatment of wild or captive animals, especially those species which may have antlers or horns. Without being limited thereto, animals which may be treated include deer, such as white-tailed deer and red deer, antelope such as blackbeck antelope, and elk, as well as sheep, goats, swine and cattle.

Referring now to the Figures, the apparatus includes an open top trough or receptacle (10) having side walls (11) and bottom (12). Although the depth of the receptacle (10) is not critical, it is preferably sufficiently shallow to allow the target animal to see over the top edge of the the side walls (11) while feeding. We have found that construction in this manner is particularly advantageous when treating nervous or wary animals such as deer, allowing the animal to feed for longer periods without taking flight. For white-tailed deer, a depth of about 5–6 inches is preferred. Support stands (13) may also be added to allow the receptacle (10) to be positioned at a suitable distance above the ground for ease of access by the target animal, as well as to prevent access by small non-target animals and rodents.

Feed supply for the device is provided by container or bin (20) positioned within receptacle (10). Feed in the bin (20) is dispensed into the bottom of the receptacle (10), where it may be accessed by the target animals, through one or more apertures or openings (21) at the lower end of the bin (20). The portion of the receptacle (10) receiving the feed from the bin (20) is defined as the feeding area (14), which feeding area is bound by the bottom (12), side walls (11) with or without optional baffle (15), and the lower end of the bin and the opening (21). The size of the opening (21) may be fixed or adjustable, such as by a sliding gate (22), to regulate the flow of the feed from bin (20) and prevent large amounts of feed from being dispensed into the feeding area (14) at one time. Use of a small opening (21) to limit the amount of feed dispensed into the feeding area (14), prevents the animal from consuming large amounts of feed in a short period and thus aids in retaining the animal at the device for a longer period of time. The use of an adjustable opening (21) is preferred when it is envisioned that different feeds may be employed. For whole kernel corn, an opening about 0.5 to 1.5 inches high is preferred, particularly about 0.75 inches. Protection of the feed in the bin (20) is afforded by cover or lid (24). Optional bin baffle (25) may also be included to ensure that the feed is completely dispensed from the bin (20). The position of the bin (20) in the receptacle (10) is not critical; it may be positioned approximately centrally or adjacent an end of the receptacle.

To deliver pesticide onto the feeding animals, pairs of vertical support members (30) for carrying pesticide applicators (31) are positioned near or adjacent the side walls (11), approximately opposite the feed bin opening (21) and feeding area (14), and extend upwardly above the upper edge of the side walls. Pesticide applicators (31) are positioned on each of the support members (30), and are adapted to apply pesticide onto an animal upon contact therewith, as described hereinbelow. When attempting to feed from the device of FIG. 1, a target animal may access feed from the end of the receptacle (10) by passing its head either between the pair of supports (30), or it may feed from the side by passing its head between one of the supports and bin (20). In either event, the back of the head, neck and/or ears of the animal will contact one of the applicators (31) when its head is turned sideways during feeding, resulting in the application of the pesticide onto that area. We have also unexpectedly discovered that many animals deliberately and vigorously rub against the applicators while feeding, further enhancing the application of the pesticide. Because the head and neck are the areas on many animals, including deer, that usually harbor the greatest number of ticks, the application provides significant ectoparasite and tick control.

The spacing and height of the support members (30) will vary with the particular target animal and the diameter of the applicators (31), and may be readily determined by the skilled practitioner. The spacing between the supports should be great enough to allow a target animal to pass its head between the applicators in order to access the feeding area (14), but small enough such that the back of the head or neck of the animal will contact one of the applicators (31) when its head is turned sideways. Similarly, the horizontal spacing of each support member (30) from the bin (20) should also be great enough to allow a target animal to pass its head between the applicator and bin, but small enough such that the back of the head or neck of the animal will contact the applicator when its head is turned sideways. The height of the support members (30) should be great enough to extend above the target animal's skull when feeding, but short enough that its antlers may pass over the support members to access the feeding area (14). For white-tailed deer, the support members (30) are preferably positioned to provide a space between the surfaces of the applicators (31) of about 3–6 inches, most preferably about 4 inches, and at a height of about 9 inches.

The apparatus also includes an outwardly extending surface (23) positioned over the feed supply bin opening (21), to render access to the feeding area (14) more difficult. To feed the animal is effectively forced to turn its head sideways, and contact with an applicator (31) is thus ensured. The size of the surface is selected to extend at least partially over the feeding area (14). For white-tailed deer, the surface (23) is preferably positioned to provide a horizontal distance between the surface of the applicators (31) and the edge of the surface of about 3–6 inches, most preferably about 4 inches. Surface (23) may be connected to the bin (20) or alternatively it may be attached to the receptacle (10) or it may be free standing. The shape of the surface (23) is not critical, and a variety of forms may be selected. In the preferred embodiment, the surface (23) is constructed as an approximately horizontal plate. It is also preferred that the surface (23) be adjustably connected to the bin (20) or receptacle (10) to allow the distance of its horizontal extension over the feeding area (14) to be varied. In an alternative embodiment, the surface (23) may be integral with the bin (20), being constructed as an outwardly inclined side wall of the bin overhanging the opening (21) area (14).

Figure 3:
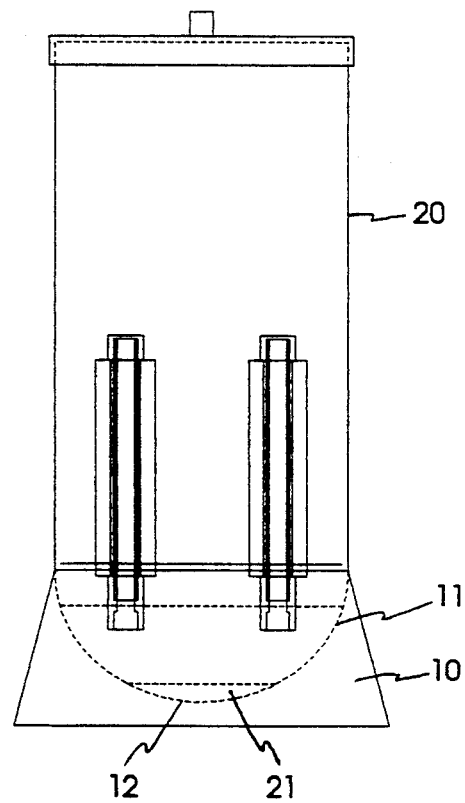
FIG. 3 is an end view of the apparatus of FIG. 1.
Figure 4:
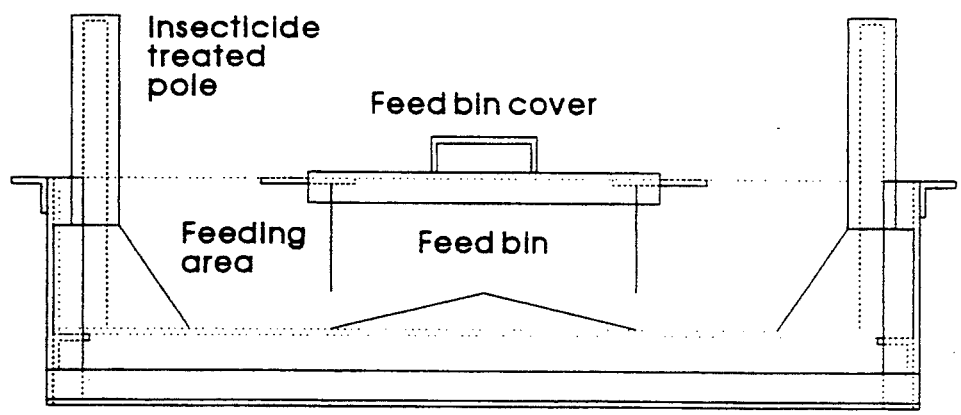
FIG. 4 is a cross-sectional view of another embodiment of the apparatus of the invention.
Figure 5:
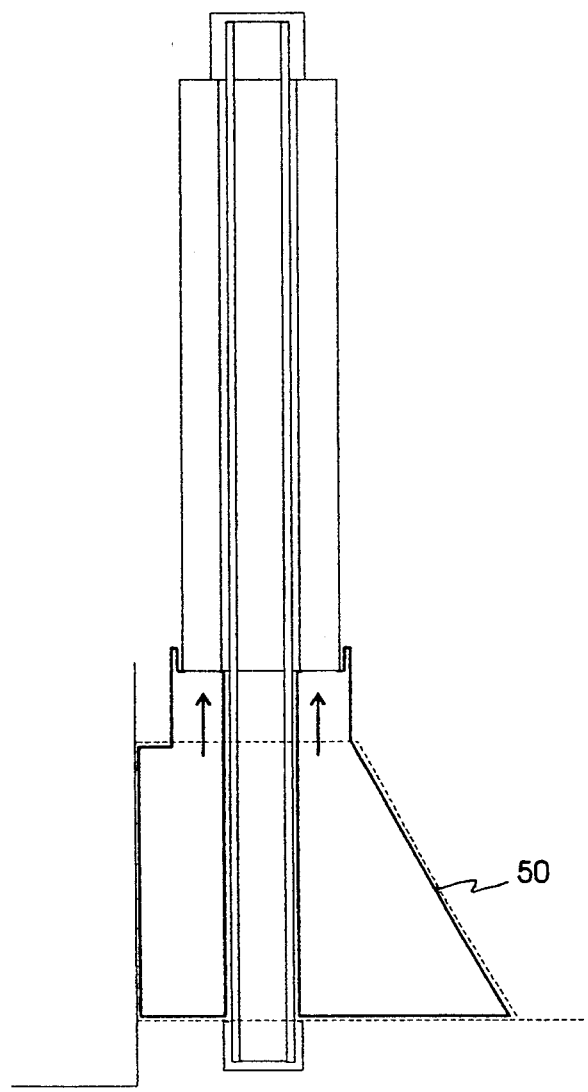
FIG. 5 is a cross-sectional view of a further embodiment of the apparatus of the invention.
Figure 6:
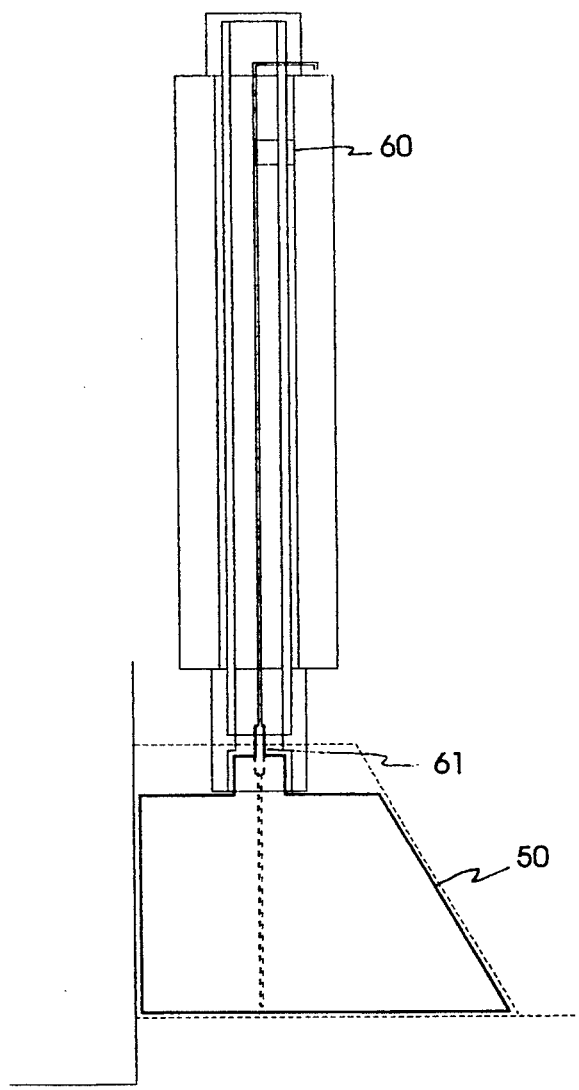
FIG. 6 is a cross-sectional view of yet another embodiment of the apparatus of the invention.

In accordance with the preferred embodiment, the side walls (11) of the receptacle (10) may be sloped inwardly as shown in FIG. 3 to reduce the spread of feed from the opening (21) and hence minimize the size of the feeding area (14). Maintaining the feed in a small feeling area (14) aids in forcing the animal to turn its head to access the feed, and consequently contact a pesticide applicator. Addition of optional baffle (15) is also preferred, which similarly functions to minimize the size of the feeding area (14).

The shape of the receptacle (10) and the number of feeding areas (14) are not critical. Although a rectangular shape is shown (in a cross-section through the horizontal) having two feeding areas (14), the practitioner will recognize that other shapes having more or fewer feeding areas may be used. Without being limited thereto, other shapes include circular, oval or square.

Pesticide applicators (31) may be constructed as a wet or liquid delivery system, or a dry or solid delivery system. FIG. 1 shows an example of a preferred wet delivery system. In accordance with this embodiment, the applicator (31) comprises an absorbent material positioned over each support member (30). Without being limited thereto, preferred absorbent materials include foam rubber and conventional paint rollers, positioned over a support (30) constructed from a length of rod or pipe, preferably PVC pipe. PVC pipe may be conveniently attached to receptacle (10) using PVC couplings (32), while the applicators (31) may be retained thereon with a PVC cap (33). Supply of pesticide to the applicators (31) is preferably through a pesticide reservoir (40), communicating with the top of each applicator through a conduit (41). To prevent excess accumulation of pesticide on the applicator (31) and dripping, pressure activated flow control valves (42) may be provided on the conduit adjacent the applicator. The valves (42) are effective to open and allow flow of pesticide onto the applicators (31) when pressure is applied upon the applicator by the feeding animal, such as by rubbing. Preferred valves (42) include but are not limited to conventional spring loaded pinch valves positioned between the support member (30) and applicator (31). An optional shut-off valve (43) may also be provided.

The device is not limited to the particular wet delivery system shown, as a variety of other wet systems may also be employed. In accordance with one alternative embodiment, the applicator may simply be an absorbent material saturated with pesticide, with no additional pesticide supply mechanism. In this embodiment, the user would need only to saturate the applicator (31) with fresh pesticide at regular intervals, such as when filling the feed supply bin (20). In another embodiment, a pesticide reservoir (50) may be provided adjacent the lower end of each applicator (31), with pesticide being wicked into the absorbent material of the applicator. In yet another alternative embodiment, a pressure activated pump (61) or a pressurized container may be provided to actively pump pesticide from a reservoir to the applicators (31). Activation of the pump may be through use of pressure sensitive controllers (60) in the applicators (31), or a weight sensitive controller positioned on the ground adjacent the receptacle (10).

As mentioned, dry pesticide delivery systems may also be used. In accordance with one such preferred embodiment, applicators (31) comprise plastic strips impregnated with pesticide, wrapped or wound around each support member (30). Suitable applicators (31) for use herein include but are not limited to Taktic strips (Hoechst Raussel Agri-Vet Co., Sommerville, N.J.) impregnated with amitraz. We have also discovered that improved contact of the applicators (31) by the animals may be achieved by slitting the plastic strips such that portions of the strips project outwardly a short distance in brush-like fashion, and also by hanging additional strips from the top of each support member (30). When dry systems are used, it is particularly preferred that the support members (30) are freely rotatable, such as rotating PVC pips, to allow contact with all sides of the applicators (31).

In use, the apparatus of this invention is positioned in the locus or vicinity of the target animals to be treated, and animal feed is loaded into the feed supply bin (20). Target animals attracted to the device to feed will be subjected to application of pesticide upon their head, neck, ears and/or antlers upon contact with the applicators (31). Without being limited thereto, corn and pelletized feeds are preferred. Attractions such as apple aromas may also be added to the feed as are conventional in the art.

The apparatus may be used for the control of a variety of ectoparasites upon animals and wildlife, including but not limited to ticks, particularly the deer tick, cattle fever tick and ear ticks, mites such as ear mites, lice, fleas, and flies such as horn flies and stable flies. Virtually any pesticide may be applied using this device. Preferred pesticides for use herein include insecticides and specifically acaricides, including: organochlorines such as lindane and methoxychlor, organophosphates such as chloropyrifos, coumaphos, crotoxyphos, diazinon, dioxathion, famphur, fenthion, naled, malathion, phosmet, ronnel, tetrachlorvonphos, and pirimophos methyl, carbamates such as carbaryl, bendiocarb, and propoxur, formamidines such as amitraz and chlordimeform, avermectins such as ivermectin, doramectin, moxidectin, and milbemycin, and pyrethroids such as permethrin, fenvalerate, cypermethrin, flucythrinate, fluvalinate, flumethrin, cyfluthrin, cyhalothrin, and deltamethrin.

It is understood that the foregoing detailed description is given merely by way of illustration and that modifications and variations may be made therein without departing from the spirit and scope of the invention.

We claim:

1. An apparatus for feeding and applying pesticide to animals comprising:
   (a) an open top receptacle having a bottom and side walls;
   (b) a feed supply bin positioned within said receptacle, said bin having an opening at the lower end thereof communicating with said bottom of said receptacle for dispensing feed from said bin to said bottom of said receptacle, said lower end together with said side walls and said bottom of said receptacle defining a feeding area;
   (c) an outwardly extending surface positioned over said opening of said bin;
   (d) at least one pair of spaced apart vertical support members adjacent said side walls and extending upwardly from said receptacle above the upper edge of said side walls, said support members being positioned approximately opposite said opening of said bin; and
   (e) a pesticide applicator positioned on each of said support members and adapted to apply pesticide onto a subject animal upon contact therewith;
   wherein said pair of support members are spaced sufficiently apart to allow an animal to pass its head therethrough and access feed in said feeding area, but close enough such that the back of the head, neck or ears of the animal will contact one of said applicators when its head is turned sideways, and further wherein said outwardly extending surface is effective to force said animal to turn its head sideways to access said feeding area.

2. The apparatus of claim 1 wherein said receptacle is rectangular, circular or oval shaped.

3. The apparatus of claim 1 wherein said side walls are inclined inwardly toward said opening of said bin.

4. The apparatus of claim 1 wherein the size of said opening of said bin is adjustable.

5. The device of claim 1 wherein said outwardly extending surface comprises an approximately horizontal surface.

6. The apparatus of claim 5 wherein said surface is adjustably connected to said bin.

7. The apparatus of claim 1 wherein said applicator comprises an absorbent material.

8. The apparatus of claim 7 wherein said device further comprises a pesticide reservoir communicating with said applicator.

9. The apparatus of claim 8 wherein said reservoir is positioned adjacent said applicator and communicates directly therewith.

10. The apparatus of claim 8 further comprising a conduit for communicating said reservoir with said applicator.

11. The apparatus of claim 10 further comprising a flow controller to control flow of pesticide from said reservoir to said applicator.

12. The apparatus of claim 11 wherein said flow controller comprises a pressure actuated valve positioned adjacent said applicator and responsive to said animal engaging said applicator.

13. The apparatus of claim 12 wherein said flow controller comprises a pump and an animal actuated pump controller.

14. A method for applying pesticides onto animals comprising:
   (a) providing an apparatus for feeding and applying pesticide to animals comprising:
       (1) an open top receptacle having a bottom and side walls;
       (2) a feed supply bin positioned within said receptacle, said bin having an opening at the lower end thereof communicating with said bottom of said receptacle for dispensing feed from said bin to said bottom of said receptacle, said lower end together with said side walls and said bottom of said receptacle defining a feeding area;
       (3) an outwardly extending surface positioned over said opening of said bin;
       (4) at least one pair of spaced apart vertical support members adjacent said side walls and extending upwardly from said receptacle above the upper edge of said side walls, said support members being positioned approximately opposite said opening of said bin; and
       (5) a pesticide applicator positioned on each of said support members and adapted to apply pesticide onto a subject animal upon contact therewith;
       wherein said pair of support members are spaced sufficiently apart to allow an animal to pass its head therethrough and access feed in said feeding area, but close enough such that the back of the head, neck or ears of the animal will contact one of said applicators when its head is turned sideways, and further wherein said outwardly extending surface is effective to force said animal to turn its head sideways to access said feeding area;
   (b) positioning said apparatus in the locus of animals to be treated;
   (c) providing animal feed to said feed supply bin; and
   (d) allowing said animals to feed from said apparatus.

* * * * *